United States Patent [19]
Zine

[11] Patent Number: 5,373,620
[45] Date of Patent: Dec. 20, 1994

[54] METHOD OF FORMING PTFE MEMBRANE/GASKET ASSEMBLY

[75] Inventor: Anthony R. Zine, Corning, N.Y.

[73] Assignee: Corning Incorporated, Corning, N.Y.

[21] Appl. No.: 82,815

[22] Filed: Jun. 28, 1993

Related U.S. Application Data

[63] Continuation of Ser. No. 911,735, Jul. 10, 1992, abandoned.

[51] Int. Cl.$^5$ .............................................. B21D 39/00
[52] U.S. Cl. ................................. 29/469.5; 29/509; 29/902; 29/163.8; 29/436
[58] Field of Search .................. 29/888.3, 902, 163.8, 29/469.5, 436, 509, 419.5; 264/248, 249, 122, 127

[56] References Cited

U.S. PATENT DOCUMENTS

| | | | |
|---|---|---|---|
| 2,068,858 | 1/1937 | Jones | 183/72 |
| 2,127,397 | 8/1938 | Freelander | 210/164 |
| 2,316,526 | 4/1943 | McDonald | 160/382 |
| 2,997,178 | 8/1961 | Lorimer | 210/266 |
| 3,082,587 | 3/1963 | Brimberg | 55/495 |
| 3,142,642 | 7/1964 | Kracklauer | 29/163.8 X |
| 3,707,832 | 1/1973 | Muller et al. | 55/486 |
| 3,801,405 | 4/1974 | Corkery et al. | 156/306 |
| 4,120,715 | 10/1978 | Ockwell | 156/252 |
| 4,238,207 | 12/1980 | Ruschke | 156/290 X |
| 4,264,447 | 4/1981 | Nicolet | 210/500 |
| 4,302,270 | 11/1981 | Nicolet | 156/290 |
| 4,340,402 | 7/1982 | Catron | 55/487 |
| 4,356,012 | 10/1982 | Hofsetter | 55/385 |
| 4,451,962 | 6/1984 | Cornelsen et al. | 29/163.8 |
| 4,473,471 | 9/1984 | Robichaud et al. | 210/450 X |
| 4,657,570 | 4/1987 | Gronholz et al. | 55/385 |
| 4,675,065 | 6/1987 | Gordon | 156/272 |
| 4,777,003 | 10/1988 | Baiborodov et al. | 264/127 X |
| 4,865,778 | 9/1989 | Leidel | 261/122 |
| 4,883,507 | 11/1989 | Rey | 55/97 |
| 4,961,891 | 10/1990 | Pitolaj | 264/127 X |
| 5,032,335 | 7/1991 | Wilson | 264/127 X |

FOREIGN PATENT DOCUMENTS

57-7219  1/1982  Japan ........................... 46/10

Primary Examiner—Timothy V. Eley
Assistant Examiner—Khan V. Nguyen
Attorney, Agent, or Firm—Brian R. Leslie

[57] ABSTRACT

A method for sealing a porous membrane constructed, at least in part, of a PTFE based material to a support gasket constructed, at least in part, of a PTFE based material. The method includes providing such a PTFE porous membrane of a preselected shape and size and providing such a PTFE support gasket of a preselected shape and size. The method further includes positioning the membrane and the support gasket in a predetermined appositional relationship within a press. The press includes a press tool of a predetermined configuration and size. The method then includes sealing the membrane and support gasket together at a common seal-zone by pressing the press tool against the membrane and the support gasket with the pressing means at a predetermined pressure for a predetermined dwell to form the membrane/gasket assembly. The method lastly includes removing the membrane/gasket from the pressing means. The disclosed method provides a membrane/gasket assembly that is durable, easily handled, easily installed and sealed within an apparatus. The method is able to be performed without applying heat or adhesives to effect the sealing of the resulting membrane/gasket assembly.

12 Claims, 2 Drawing Sheets

METHOD OF FORMING PTFE MEMBRANE/GASKET ASSEMBLY

This is a continuation of application Ser. No. 07/911,735, filed Jul. 10, 1992, now abandoned.

FIELD OF THE INVENTION

This invention relates generally to methods for forming membrane/gasket assemblies. More particularly, this invention relates to methods for sealing a PTFE-based membrane and a PTFE- based support gasket together to form a membrane/gasket assembly. Such a membrane/gasket assembly is especially suitable for use in liquid-liquid extractor/concentrators utilizing a hydrophobic porous membrane therein.

BACKGROUND OF THE INVENTION

Porous membranes are typically sheets of preselected material having certain characteristics that are optimal for a particular application. For example, porous membranes made of polymers are often used to filter solids from liquids. Recently, thin porous membranes made of polytetrafluoroethylene, PTFE, having the characteristic of being hydrophobic, have been found to be suitable for use in certain scientific laboratory apparatuses to prevent the passage of water while allowing other liquids to pass through the membrane. An apparatus referred to as a liquid-liquid hydrophobic concentrator/extractor is one such apparatus that employs a thin hydrophobic PTFE membrane to block the passage of water in one section of the apparatus while allowing other liquids, such as organic solvents, to pass downstream to other sections of the apparatus for subsequent processing.

A problem encountered with using porous PTFE membranes in laboratory apparatuses is the membrane is typically very thin and fragile making it prone to being damaged while being transported, stored, and handled. The thin fragile membrane is thus difficult to install in apparatuses such as the above discussed hydrophobic concentrator/extractor without damaging or mis-positioning the membrane. The additional care and time taken to install the membrane in an apparatus leads to extra expenses for a laboratory, especially if the laboratory has a limited number of such apparatuses. An additional problem with using porous PTFE membranes in various apparatus is the porous membranes have a tendency to wick liquids to the periphery of the membrane and beyond the clamped joint, or coupling, in which the membrane is installed. Thus, the wicking tendency makes it difficult to obtain an adequate seal about the membrane without possibly over stressing the joint, the clamping mechanism, or the surrounding structure of the apparatus containing the membrane.

There are various known methods of sealing, or bonding, gaskets about thin porous membranes to facilitate handling and sealing of the membrane within an accommodating apparatus. Such methods include bonding the periphery of the membrane to the gasket by the application of adhesives to regions common to the membrane and the gasket. However, the use of such adhesives on membranes positioned in apparatuses in which organic solvents are used for processing liquid samples, such as a liquid-liquid concentrator/extractor apparatus, may cause the adhesive to degrade and contaminate the fluids being processed within the apparatus.

It is also known that polymer membranes may be sealed to polymer gaskets by applying sufficient heat to a preselected common region of the membrane and the gasket to form a fused bond therebetween. However, the amount of heat applied to the region must be carefully controlled so as not to exceed the optimal heat sealing temperatures of the membrane and/or the gasket.

SUMMARY OF THE INVENTION

An object of the present invention is to disclose a method for sealing a porous membrane and support gasket together to form a membrane/gasket assembly that is durable, easily handled, easily positioned and secured within an apparatus.

Another object of the disclosed invention is to provide a method for sealing a porous membrane and a support gasket together which is able to be performed without applying heat to effect the seal.

Another object is to provide a method of sealing a porous membrane and support gasket together wherein the resultant membrane/gasket assembly formed by the method is free of adhesives that may degrade in the presence of solvent and thereby contaminate the liquids contained within an apparatus in which the membrane gasket/gasket assembly has been installed.

The above objects, as well as others, are achieved by the disclosed method for sealing a porous membrane constructed, at least in part, of a PTFE based material to a support gasket constructed, at least in part, of a PTFE based material. The disclosed method includes providing such a porous membrane of a preselected shape and size and providing such a support gasket of a preselected shape and size. The method further includes positioning the membrane and the support gasket in a predetermined appositional relationship within a pressing means. The pressing means includes a press tool of a predetermined configuration and size. The method then includes sealing the membrane and support gasket together at a common seal-zone by pressing the press tool against the membrane and the support gasket with the pressing means at a predetermined pressure for a predetermined dwell to form the membrane/gasket assembly. The method lastly includes removing the membrane/gasket from the pressing means.

DETAILED DESCRIPTION OF THE INVENTION

Figure 1:
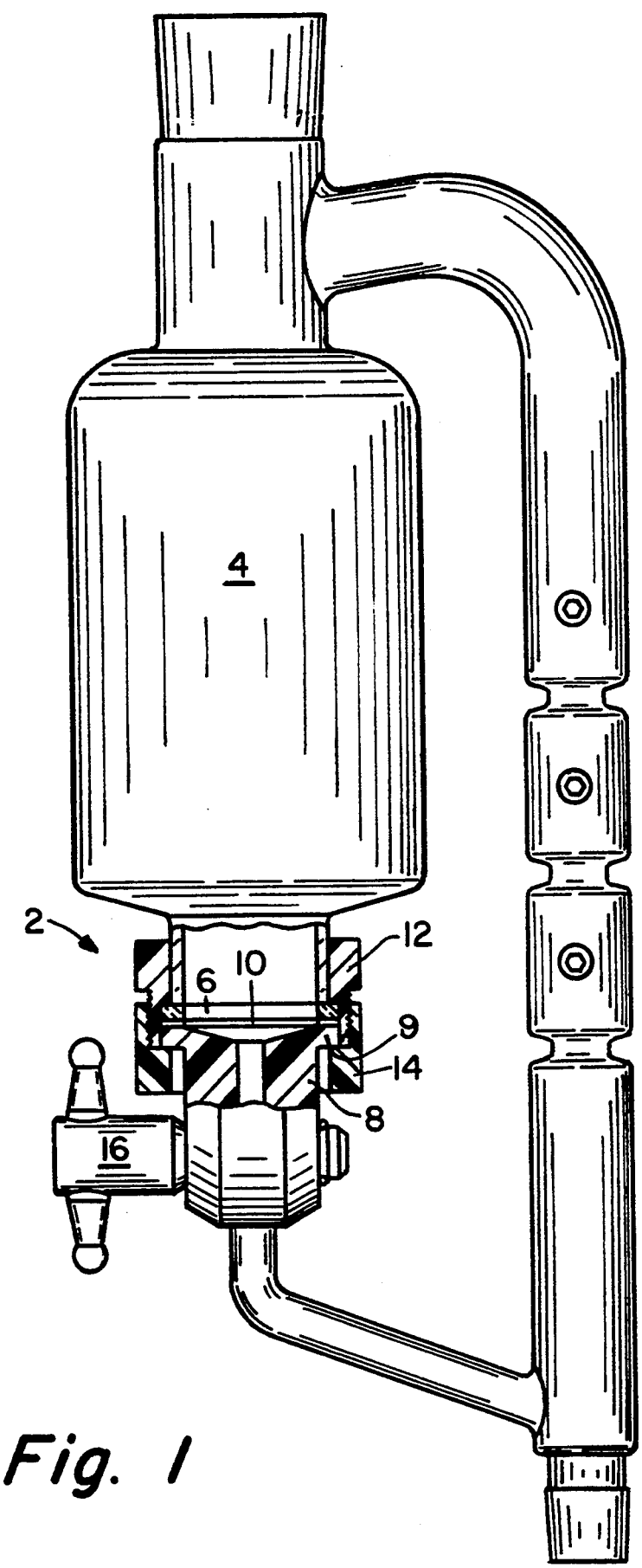
FIG. 1 is a front view, partially sectioned, of a representative laboratory apparatus which is suitable for utilizing a porous membrane/gasket assembly formed by the disclosed method.

Referring now to FIG. 1 of the drawings. For background purposes, a representative laboratory apparatus that requires a porous hydrophobic membrane in order to process liquid samples is shown in FIG. 1. The particular apparatus shown is commonly referred to as a combination liquid-liquid concentrator/extractor and is denoted generally by numeral 2. The apparatus includes a sample containing body 4 which is usually filled with a liquid sample, such as water, and an organic solvent which is used to extract impurities out of the sample water for analyses. Containing body 4 is provided with a flange 6. Proximate to flange 6 is a valve body 8 which has a flange 9. A porous hydrophobic membrane 10 is positioned between flanges 6 and 9 in order to serve as a barrier to the sample water contained in body 4. However, membrane 10 being hydrophobic, allows the organic solvent, and impurities carried thereby, to pass through the membrane and on through valve body 8. Flanges 6 and 9 are pressed against membrane 10 by cooperating threaded clamps 12 and 14. Flanges 6 and 9 are potential sites of fluid leakage if membrane 10 is not sufficiently secured therebetween. Valve 16 controls the flow of the solvent to outlet 18 where the solvent is directed for further processing.

Figure 2:
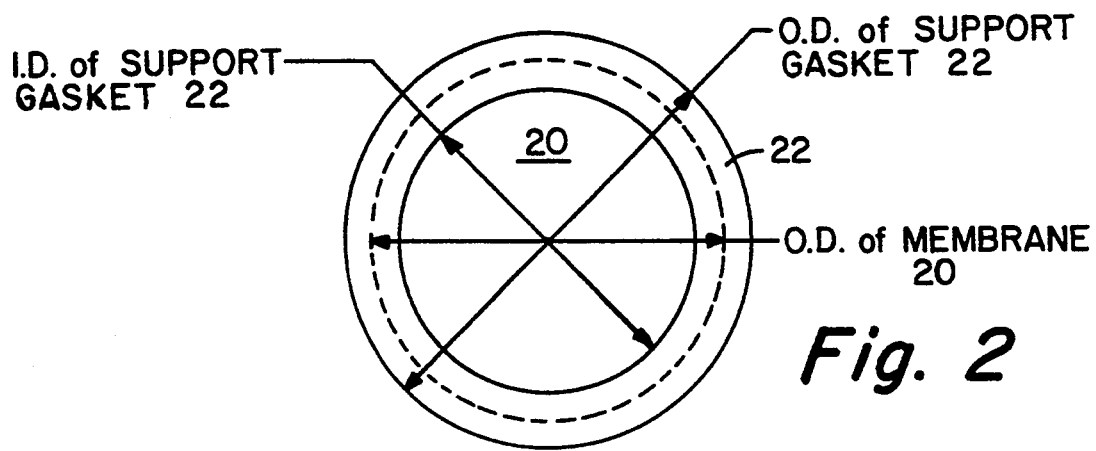
FIG. 2 is a top view of the preferred shape, identified dimensions, and relative placements of a porous membrane and a support gasket prior to being sealed by the disclosed method.

Referring now to FIG. 2 of the drawings. FIG. 2 depicts a circular hydrophobic porous membrane 20 underlying a ring-shaped support gasket 22. Membrane 20 and gasket 22, after being sealed by the disclosed method, is particularly suitable for use in apparatus 2 in the place of only membrane 10. Membrane 20 has an outer diameter, O.D., and support gasket 22 has an inner diameter, I.D. and an outer diameter, O.D. Preferably, the O.D. of membrane 20 is less than the O.D. of support gasket 22.

Figure 3:
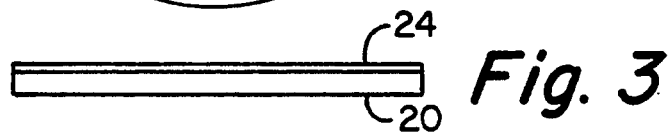
FIG. 3 is a front view of a porous membrane having an optional backing material that has previously been laminated to the porous membrane, the membrane with backing plate may also be sealed to a support gasket by the disclosed method.

Porous membrane 20 is constructed, at least in part, of PTFE, and depending upon the application, it may have hydrophobic characteristics. That is, the ability to repel water while allowing other liquids, or vapors, to pass through the membrane. It is common for membrane 20 to be optionally provided with a backing material 24 that has been previously laminated on to one side of membrane 20. Such an arrangement is shown in FIG. 3 of the drawings. The backing material provides structural support to membrane 20 which is often subject to head pressures that would otherwise rupture a membrane not having backing material. Porous membranes, with and without backing material, are available commercially from such entities as Gelman Sciences, 600 South Wagner Rd., Ann Arbor, Mich. 48106 under the trademark Zefluor.

Support gasket 22 is preferably made, at least in part, of a PTFE material that has been expanded such as the material marketed under the trademark GORE-TEX and commercially available from W. L. Gore & Associates, Box 1010, Elkton, Md. 21922-1010.

The present invention is a method of sealing together a porous membrane such as membrane 20, with or without an optional backing material such as backing material 24, to a support gasket such as support gasket 22 to form a membrane/gasket assembly suitable for use in an apparatus such as laboratory apparatus 2. The method includes providing a porous membrane of a preselected shape and size that is constructed at least in part of PTFE based material. The method further includes providing a support gasket of a preselected shape and size that is constructed at least in part of PTFE based material. It is preferred that the support gasket be made of expanded PTFE such as the material marketed under the trademark GORE-TEX, and that the thickness of the support gasket be significantly greater than the thickness of the porous membrane. A support gasket formed of such material, after being sealed to membrane 20, is particularly effective in forming a barrier to liquids that tend to migrate horizontally through membrane 20 and beyond a jointed section of an apparatus holding the membrane. Additionally, a support gasket made of expanded PTFE lends itself to being easily sealed in a joint structure of an apparatus thereby eliminating the possibility of over stressing the joint structure by applying excessive clamping forces thereabout to effect a seal sufficient to prevent such horizontal migration through a porous membrane.

The method further includes positioning the provided membrane and the provided support gasket in apposition in a pressing means having a press tool of a predetermined configuration and size. Preferably, if the membrane is provided with a backing material, the backing material side is placed facing away from the support gasket. However, the backing material side may be placed facing the support gasket if so desired.

Figure 4:
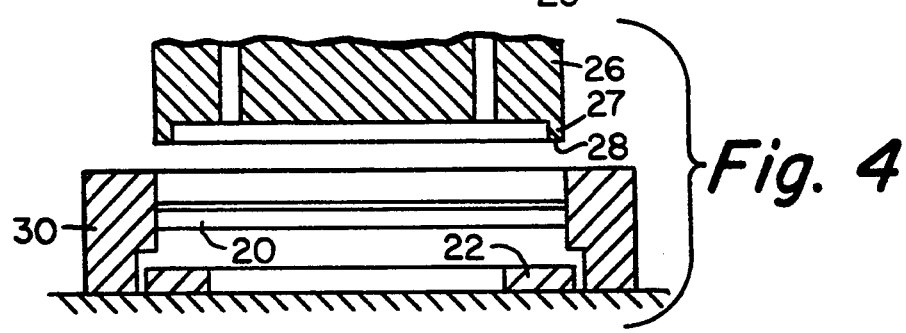
FIG. 4 is a front cross-sectional view of a press tool, a porous membrane, a support gasket, and a press die positioned within a pressing means (not shown) prior to sealing the membrane and the support gasket together.
Figure 5:
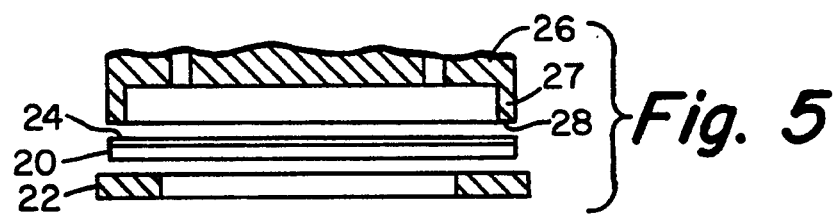
FIG. 5 is a cross-sectional front view of the porous membrane, the support gasket, and the press tool of the pressing means shown in FIG. 4 of the drawings prior to sealing the membrane and the gasket together.

Preferably, the press tool has an annular flange having an end face having an outside diameter that approximates the nominal outside diameter of the membrane, and has a face width of a predetermined value, as measured radially outward. FIG. 4 of the drawings, is a cross-sectional view of the preferred press tool 26 located above membrane 20 and support gasket 22. Press tool 26 has an annular flange 27 preferably having a perpendicular end face 28. Pressing die 30, having a stepped bore of a first inside diameter, I.D., and a second larger inside diameter, I.D., serves to retain support gasket 22 and membrane 20 in a centered relationship, however, use of pressing die 30 is preferred, but not mandatory. An enlarged cross-sectional view of press tool 26 and membrane 20 and 22 is shown in FIG. 5 of the drawings. Width of end face 28, as measured radially, is depicted as dimension W. The press tool and pressing die may be made of any sufficiently hard material that will not unacceptably deform under pressing loads. Such materials include a wide variety of metals, including steels, especially high carbon steels for example, plastics, glasses, and ceramics.

The next step of the disclosed method includes sealing the membrane and the support gasket together at a common seal zone by pressing the membrane, including any backing material, against the support gasket by the pressing means at a predetermined pressure for a predetermined dwell to form a membrane/gasket assembly. Suitable pressures range from 70 to 250 $kg/cm^2$ and suitable dwells range from 1 to 30 seconds. The membrane/gasket assembly is then removed from the pressing means.

Figure 6:
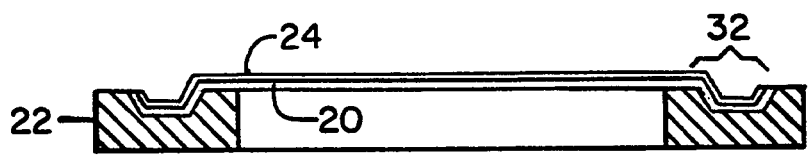
FIG. 6 is an enlarged cross-sectional front view of the membrane/gasket assembly after it has been sealed by the disclosed method.

An enlarged cross-sectional view of a membrane/gasket assembly formed by the described method is shown in FIG. 6. As can be seen in FIG. 6 a portion of membrane 20 and backing material 24 is compacted and sealed to support gasket 22 about common seal zone 32. Seal zone 32 thus prevents liquids from being further wicked horizontally through membrane 22 to the outer periphery of the membrane/gasket assembly when the assembly is installed in an apparatus engaging in the processing of liquids such as apparatus 2 shown in FIG. 1. Furthermore, the method of forming the membrane/assembly does not require that heat be added to seal zone 32, or elsewhere, when carrying out the disclosed method. Therefore, the need for providing a costly heating element within, or proximate to, the press tooling is eliminated. Also, the additional costs of providing temperature monitoring equipment to maintain process consistency is eliminated. The resulting "cold" seal between the membrane and the gasket is surprisingly strong and durable. The resulting assembly is thus easily transported, stored, handled, installed, and will operate under service conditions with expedience and a limited amount of care.

Two examples of membrane/gasket assemblies that were formed by the disclosed method are set forth below:

EXAMPLE 1

Porous Membrane material: Gelman Zefluor PTFE Hydrophobic Membrane P5PL025 (backer material included thereon by Gelman)
Nominal O.D. of circularly-shaped Membrane: 25 mm
Nominal thickness of Porous Membrane (including backing material): 0.28 mm
Support Gasket material: W. L. Gore & Assoc. Gortex PTFE washer GR 3200008
Nominal I.D. of ring-shaped Support Gasket: 21.95 mm
Nominal O.D. of ring-shaped Support Gasket: 28.00 mm
Nominal thickness of Support Gasket: 0.762 mm
Press tool material: High Carbon Steel
Nominal O.D. of end face of Press Tool having annular flange: 24.95 mm
Nominal I.D. of end face of Press Tool having annular flange: 22.92 mm
Radial Width of end face of Press Tool: 1.02 mm
Pressing Die material: High Carbon Steel
First Bore I.D. in Pressing Die: 25.65 mm
Second Bore I.D. in Die: 28.83 mm
Depth of Second Bore in Pressing Die: 1.14 mm
Pressing Pressure: approximately 175 kg/cm$^2$
Dwell Time: approximately 15 seconds

EXAMPLE 2

Porous Membrane material: Gelman Zefluor PTFE Hydrophobic Membrane P5PL047 (backer material included thereon by Gelman)
Nominal O.D. of circularly-shaped Membrane: 47.00 mm
Nominal thickness of Porous Membrane (including backing material): 0.28 mm
Support Gasket material: W.L. Gore & Assoc. Gortex PTFE washer GR 3200111SC
Nominal I.D. of ring-shaped Support Gasket: 39.60 mm
Nominal O.D. of ring-shaped Support Gasket: 53.09 mm
Nominal thickness of Support Gasket: 1.02 mm
Press tool material: High Carbon Steel
Nominal O.D. of end face of Press Tool having annular flange: 46.94 mm
Nominal I.D. of end face of Press Tool having annular flange: 44.61 mm
Length of annular flange of Press Tool: 2.03 mm
Radial Width of end face of Press Tool: 1.17 mm
Pressing Die material: High Carbon Steel
First Bore I.D. in Pressing Die: 47.07 mm
Second Bore I.D. in Pressing Die: 53.09 mm
Depth of Second Bore in Pressing Die: 1.14 mm
Pressing Pressure: approximately 175 kg/cm$^2$
Dwell Time: approximately 15 seconds Although the preferred method of practicing the disclosed invention has been discussed herein, it is contemplated that various modifications and changes may be made to particular features of the invention without departing from the spirit and scope of the invention as claimed.

I claim:

1. A method for sealing a membrane and gasket together to form a membrane/gasket assembly consisting of the steps of:
   a) providing a porous membrane of a preselected shape and material;
   b) providing a support gasket of a preselected shape and size that is constructed, at least in part, of a PTFE based material;
   c) positioning the membrane and the support gasket directly opposite each other within a pressing means, the pressing means including a press tool of a predetermined configuration and size;
   d) sealing the membrane and the support gasket together at a common seal-zone by pressing the press tool against the membrane and the support gasket with the pressing means at a predetermined pressure for a predetermined dwell so as to deform the porous membrane and the gasket at the seal zone into a channel-shaped and form the membrane/gasket assembly, wherein the seal zone prevents liquids from leaking out horizontally to the periphery of the assembly; and
   e) removing the membrane/gasket assembly from the pressing means.

2. The method of claim 1 wherein the porous membrane is circular and has a nominal diameter ranging from 15 to 75 millimeters and a thickness ranging from 0.1 to 2 millimeters.

3. The method of claim 1 wherein the support gasket is an annular ring having a nominal inside diameter ranging from 10 to 70 millimeters, a nominal outside diameter ranging from 12 to 100 millimeters, and having a nominal thickness ranging from 0.5 to 5.0 millimeters.

4. The method of claim 1 wherein the press tool has a longitudinal axis and has an end having an annular flange that terminates into an end face that is approximately perpendicular to the longitudinal axis of the press tool.

5. The method of claim 4 wherein the end face is circular and has an approximate width, as measured radially, ranging from 0.5 to 10 millimeters.

6. The method of claim 1 wherein the porous membrane includes a backing material previously laminated to the porous membrane.

7. A method for sealing a membrane and gasket together to form a membrane/gasket assembly consisting of the steps of:
   a) providing a porous membrane of a circular shape having a nominal diameter ranging from 15 to 75 millimeters that is constructed essentially of a PTFE material;
   b) providing an annular support gasket of a circular ring having a nominal inside diameter ranging from 10 to 70 millimeters and having a nominal outside diameter ranging from 12 to 100 millimeters, the gasket constructed essentially of a PTFE based material;

c) positioning the membrane and the support gasket directly opposite each other within a pressing means, the pressing means including a press tool having an annular flange terminating into an approximately perpendicular end face, the end face having an outside diameter which approximates the nominal outside diameter of the membrane, and an end face width, measured radially, ranging from 0.5 to 5 millimeters;

d) sealing the membrane and the support gasket together at a common seal-zone by pressing the press tool against the membrane and the support gasket with the pressing means at a pressure in the range of 70 to 250 kg/cm$^2$ for a dwell in the range of 1 to 30 seconds so as to deform the porous membrane and the gasket at the seal zone into a channel-shaped and form the membrane/gasket assembly, wherein the seal zone prevents liquids from leaking out horizontally to the periphery of the assembly; and e) removing the membrane/gasket assembly from the pressing means.

8. The method of claim 7 wherein the nominal diameter of the membrane is 25 millimeters, the nominal inside diameter of the gasket is 22 millimeters, the nominal outside diameter of the gasket is 28 millimeters, the gasket has a nominal thickness of approximately 0.75 millimeters, and the end face has a radial width of approximately 1 millimeter.

9. The method of claim 7 wherein the nominal diameter of the membrane is 47 millimeters, the nominal inside diameter of the gasket is 40 millimeters, the nominal outside diameter of the gasket is 53 millimeters, the gasket has a nominal thickness of approximately 1.0 millimeters, and the end face has a radial width of approximately 1.2 millimeter.

10. The method of claim 7 wherein the porous membrane includes a PTFE backing material previously laminated to the porous membrane.

11. The method of claim 1 or 7 wherein the material of at least one of the porous membrane and annular support gasket is an expanded PTFE material.

12. The method of claim 11 wherein the expanded PTFE material is GORE-TEX.

* * * * *